United States Patent [19]

Anderson

[11] Patent Number: 5,016,920

[45] Date of Patent: May 21, 1991

[54] PIPELINE COUPLING

[75] Inventor: Robert W. Anderson, Northumberland, England

[73] Assignee: Anson Limited, United Kingdom

[21] Appl. No.: 561,906

[22] Filed: Aug. 2, 1990

[30] Foreign Application Priority Data

Aug. 8, 1989 [GB] United Kingdom ............. 89.18093.9

[51] Int. Cl.[5] ............................................. F16L 35/00
[52] U.S. Cl. ........................................ 285/39; 285/92;
285/334.2; 285/354
[58] Field of Search .................. 285/92, 39, 334.2, 86,
285/354, 89; 403/320

[56] References Cited

U.S. PATENT DOCUMENTS

| | | | |
|---|---|---|---|
| 1,821,867 | 9/1931 | Wilson | 285/334.2 |
| 3,942,838 | 3/1976 | Bailey et al. | 403/320 X |
| 4,919,456 | 4/1990 | Wong | 285/334.2 X |
| 4,921,284 | 5/1990 | Singeethum | 285/334.2 X |

FOREIGN PATENT DOCUMENTS 2112892  7/1983  United Kingdom ................... 285/92

*Primary Examiner*—Dave W. Arola
*Attorney, Agent, or Firm*—Abelman Frayne Rezac & Schwab

[57] ABSTRACT

A pipeline coupling comprises first and second substantially annular connecting pieces at each end of a length of pipe, an internally threaded nut on the first connecting piece and a corresponding external thread on the second connecting piece, and a sealing ring for location between adjacent ends of two lengths of pipe to be connected, a sealed connection between the two lengths of pipe being effected by screwing the nut onto the external thread to draw the connecting pieces axially towards one another and to compress the sealing ring therebetween. A substantially annular locking ring is mounted on the second connecting piece to be axially movable therealong but rotatably fixed relative thereto, the locking ring and nut being provided with corresponding projections and recesses adapted to engage with one another to prevent relative rotation between the two connecting pieces, releasable means retaining the projections and the recesses in engagement with one another.

7 Claims, 1 Drawing Sheet

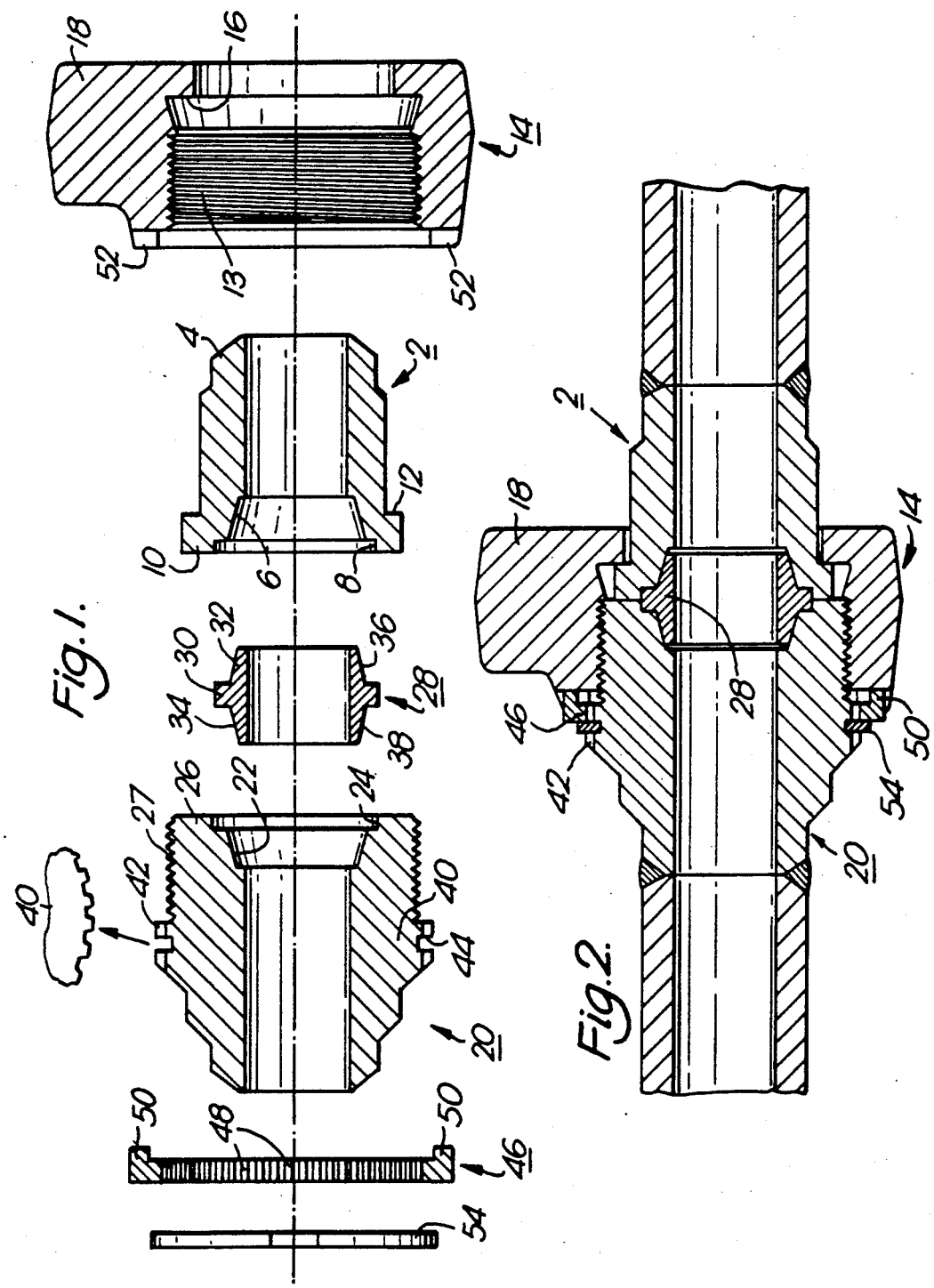

PIPELINE COUPLING

BACKGROUND OF THE INVENTION

This invention relates to pipeline couplings and has particular, though not exclusive, application to the coupling of lengths of pipe to form pipelines for conveying fluids at high pressure in oil exploration, oil production and related industries.

Such pipelines commonly comprise a series of interconnected lengths of steel pipe, adjacent lengths of which may be interconnected with one another by any one of a number of different coupling arrangements dependent upon the location and application of the pipeline in question.

One known coupling arrangement comprises a flat annular plate welded or screwed to each end of each length of pipe, said lengths being interconnected by means of a series of angularly-spaced nuts and bolts passing through abutting plates on the adjacent ends of the lengths to be connected, a gasket or ring type seal being located between the abutting plates.

Coupling arrangements of this type, which it will be appreciated are somewhat time-consuming to effect and dismantle, are commonly used on installations of a permanent nature where the time involved in installing or replacing the coupling is not of importance.

A further known coupling arrangement comprises a clamp surrounding the adjacent ends of two lengths of pipe to be interconnected, said ends having tapering external flange portions formed therearound, and the internal surface of the clamp having corresponding internal tapered regions formed thereon for co-operation with said flange portions on the pipe lengths. On tightening of the clamp, which may consist of two or more components, around the ends of the pipe lengths by means of associated nuts and bolts, said lengths are drawn axially towards one another to compress a seal located therebetween and to effect the joint.

Clamp couplings of this general type are more compact than the above-detailed flange couplings and are therefore used in locations where space is at a premium and where the weight of the coupling is to be taken into account. However, again, clamp couplings of this type take time to install and replace and are therefore only appropriate in permanent or semi-permanent installations.

It is sometimes necessary for pipeline couplings to be quickly and easily released or effected and, in such a situation, it is common practice to use a union incorporating an internally-threaded nut on one component co-operating with an external thread on the other component.

A preferred coupling of this nature is the so-called hammer lug union. Such a union comprises a male connecting piece at one end of a length of pipe and carrying thereon an internally-threaded nut the outer wall of which is provided with a series of radially-projecting, circumferentially-spaced lugs, and a female connecting piece at the other end of the length of pipe, said female connecting piece being externally threaded and housing therein an annular sealing ring.

Interconnection of two lengths of pipe is effected by locating the end of the male connecting piece of one length into the female connecting piece of the other length, drawing the nut over the male connecting piece and onto the correspondingly-threaded portion of the female connecting piece and tightening the nut onto ..said female connecting piece by hammering tangentially on the lugs of the nut. Sealing is achieved by co-operation between the abutting ends of the two connecting pieces and the seal, over-compression of the seal being prevented by metallic interference of the two connecting pieces.

It will be appreciated that such an arrangement enables extremely quick making and breaking of the connection, such hammer lug unions therefore being used in temporary or semipermanent installations where speed of connection or disconnection is of essence. However, their reliability is not such that they can be used in permanent installations.

SUMMARY OF THE INVENTION

It is an object of the invention to provide a pipeline coupling incorporating an internally-threaded nut, which coupling can be quickly made and broken but which can also be applied to permanent installations.

According to the present invention there is provided a pipeline coupling comprising a first substantially annular connecting piece at one end of a length of pipe, an internally threaded nut located on, to surround, said first connecting piece, a second substantially annular connecting piece at the other end of said length of pipe and having an external screw-thread therearound corresponding with the internal thread of said nut, and a sealing ring for location between adjacent end faces of two lengths of pipe to be connected, the arrangement being such that, on securing of the nut surrounding the first connecting piece onto the externally threaded portion of the second connecting piece, the two connecting pieces are drawn axially towards one another to compress the sealing ring therebetween and to effect a seal between the two connecting pieces, the coupling further comprising a substantially annular locking ring mounted on the second connecting piece to be movable axially therealong but rotatably fixed relative thereto, said locking ring and the nut on the first connecting piece being provided with corresponding projections and recesses thereon adapted to engage with one another to prevent relative rotation therebetween, and releasable means for retaining the projections and recesses on the locking ring and the nut in engagement with one another.

The provision of the locking ring and releasable retaining means ensures that the first and second connecting pieces are effectively secured together in permanent relationship whereby vibration of the coupling or accidental knocking thereof will not inadvertently release the connection.

Conveniently, the internally-threaded nut has a series of circumferentially-spaced, radially-projecting lugs formed thereon.

In a preferred embodiment of the invention, the external surface of the second connecting piece is provided with a plurality of circumferentially-spaced, axially extending serrations, the internal surface of the locking ring being provided with a corresponding plurality of co-operating serrations.

Conveniently, the locking ring includes a plurality of circumferentially-spaced projections extending axially forwardly therefrom, the nut on the first connecting piece being provided with a corresponding plurality of recesses therein each adapted to receive an associated one of said projections.

The means for retaining the projections and recesses on the locking ring and on the nut in engagement with one another may comprise a retaining ring or circlip received in a circumferential groove in the second connecting piece, the circlip reacting between said groove and the rear surface of the locking ring and being selectively releasable from within said groove.

A preferred application of the invention is in a pipeline coupling provided with a metallic sealing ring for location between the adjacent end faces of the two lengths of pipe to be connected, the first and second connecting pieces each having a tapering bore therethrough the diameter of which increases towards the end of the associated connecting piece, and the metallic sealing ring including a central annular portion for location between the end faces of the first and second connecting pieces, and opposed end portions the external circumferential surfaces of which taper inwardly in a direction from the central annular portion towards the associated end of the sealing ring, the arrangement being such that, on location of the sealing ring between the first and second connecting pieces of the lengths of pipe to be connected, the opposed end portions of the sealing ring are received within the tapering bores of the first and second connecting pieces respectively and, on screwing of the nut surrounding the first connecting piece onto the externally threaded portion of the second connecting piece, the two connecting pieces are drawn axially towards one another, the tapering surfaces of the sealing ring and the bores in the connecting pieces cooperating to distort said end portions of the sealing ring to effect seals between said ring and said bores.

The use of a metallic sealing ring in place of the more conventional elastomer seal enables the pipeline coupling to be used in environments where:

(a) the service temperature exceeds that which an elastomer seal can withstand;

(b) fire hazard exists and where the seal must be capable of holding pressure for a predetermined time when engulfed by fire;

(c) the equipment in which it is installed is to be used for fire-fighting purposes and may be subjected to intense heat;

(d) high pressure gases are present and where rapid decompression is necessary, as such decompression could result in implosion of an elastomer seal because any gas that has permeated the elastomer may not itself be able to decompress sufficiently quickly to avoid such implosion.

Conveniently, the acute angle between the tapering surfaces of the opposed end portions of the metallic sealing ring and the central longitudinal axis of said ring is smaller than the common acute angle between the tapering surfaces of the bores of the first and second connecting pieces and the longitudinal central axes of said connecting pieces.

Preferably the end faces of the first and second connecting pieces are each recessed to receive therein an associated part of the central annular portion of the metallic sealing ring, said end faces each including an annular outer region bounding the associated recess for abutment one with the other to determine the limit of axial movement of the connecting pieces one towards the other and therefore the sealed position of the two connecting pieces relative to one another.

BRIEF DESCRIPTION OF THE DRAWINGS

FIG. 1 is an exploded view, in longitudinal section, of the components of a coupling according to the invention, and FIG. 2 is a longitudinal section through a coupling according to the invention.

DESCRIPTION OF THE PREFERRED EMBODIMENT

Referring to the drawings, the illustrated coupling comprises a first connecting piece indicated generally at 2, one end 4 of which is adapted for attachment, for example by butt welding, to one end of a length of pipe. The connecting piece 2 has a tapering bore 6 the diameter of which increases towards the other, open end thereof.

A recess 8 is formed in the free end face of the connecting piece 2, said recess 8 being bounded by an annular abutment shoulder 10 for reasons which will become apparent, while the outer surface of the first connecting piece 2 includes an annular increased-diameter abutment surface 12 in a plane extending transversely of the connecting piece, again for reasons which are detailed below.

A nut provided with an internal thread 13 is indicated generally at 14 and is located on, to surround, the connecting piece 2, said nut being formed with an annular internal abutment surface 16 adapted to engage the surface 12 of the connecting piece 2 to determine the limit of axial movement of the nut on the connecting piece 2. A series of three circumferentially-spaced, radially projecting lugs 18 are formed on the outer surface of the nut 14, only one of said lugs 18 being shown in the drawings.

The coupling further comprises a second connecting piece indicated generally at 20, one end of which is adapted for attachment, for example by butt welding, to the other end of the aforementioned length of pipe. The second connecting piece 20, like the first connecting piece 2, is provided with a tapering bore 22, a recess 24 in the free end face thereof, and a bounding annular abutment shoulder 26.

The external surface of the second connecting piece 20 is provided with a screw-thread 27 corresponding in pitch and diameter with the internal thread 13 in the nut 14.

The coupling is completed by a metallic sealing ring indicated generally at 28, typically of stainless steel or soft iron, and including a central annular portion 30 the external diameter of which corresponds with the diameter of the recesses 8,24 in the connecting pieces 2,20, and a pair of opposed end portions 32,34 each having tapering external surfaces 36,38 respectively, said end portions 32,34 being adapted to be received in the end regions of the bores 6,22 respectively of the connecting pieces 2,20.

The acute angle the tapering surfaces 36,28 make with the central longitudinal axis of the sealing ring 38 is slightly less than the common acute angle the tapering surfaces defining the bores 6,22 make with the central longitudinal axis of the associated connecting pieces 2,20.

Coupling together of lengths of pipe each of which incorporate at their opposed ends a first connecting piece 2 and a second connecting piece 20 is effected as follows.

With a metallic sealing ring 28 located with its central portion 30 seating in the recess 8 or 24 in the connecting piece 2 or 20 of one of the two lengths of pipe to be joined, the other length of pipe is positioned with its connecting piece 20 or 2 closely adjacent said first-mentioned connecting piece. The nut 14 on the connecting piece 2 is then threaded onto the connecting piece 20 with the opposed end portions 32,34 of the sealing ring 28 received in the associated bores 6,22. The nut 14 is tightened by applying a tangential hammering force to the lugs 18 until no further movement of the nut can occur, this position being determined by abutment of the shoulders 10,26 on the two connecting pieces.

As the nut is tightened and with the surfaces 12,16 abutting one another, the metallic sealing ring is deformed both axially by compression of the central portion 30 between the end faces of the two connecting pieces 2,20 and by deformation of the tapering end portions 32,34 by the tapering surfaces defining the bores 6,22 because of the slight difference in angles thereof and such that said end portions 32,34 are an interference fit in the associated bores 6,22.

Means are provided to ensure that the coupling cannot inadvertently be released from the connected position, for example by accidental reverse knocking of the lugs 18 or by vibration of the coupling as a whole.

In this respect, the connecting piece 20 includes an increased-diameter portion 40 immediately behind the external thread 27 thereon, said portion 40 being provided with a series of circumferentially-spaced, axially-extending splines or serrations 42 as well as a circumferential groove 44 therein intermediate the length of the serrations 42.

Mounted on the connecting piece 20 is an annular locking ring indicated generally at 46 and provided with internal splines or serrations 48 which are adapted to mate with those on the portion 40 of the connecting piece 20.

Thus the ring 46 can be moved axially along the connecting piece 20 into an operative position surrounding the portion 40 thereof with the serrations 42 and 48 mating to prevent relative rotation between the locking ring 46 and the connecting piece 20.

The locking ring 46 further includes a plurality of, for example a pair of, diametrically opposed lugs or keys 50 projecting forwardlY therefrom, the nut 14 including a corresponding plurality of recesses or keyways 52 in the front face thereof each adapted to receive therein an associated one of the keys 50 as detailed below.

Locking together of the connecting pieces 2 and 20 is effected as follows. With the pieces 2,20 having been coupled together as described above, the locking ring 46 is moved axially along the connecting piece 20 with the keys 50 aligned with the keyways 52 in the nut 14 into its operative position on the portion 40 of the connecting piece 20 with the serrations 42,48 mating with one another, in which position the keys 50 are received within associated ones of the keyways 52 in the nut 14.

In this operative position of the ring 46, the rear surface thereof is just clear of the front face of the groove 44, and locking of the ring 46 in the operative position is effected by means of a circlip 54 which is sprung into the groove 44 to react between the groove 44 and the rear surface of the ring 46. The natural internal diameter of the circlip 54 is substantially equal to the diameter of the base of the groove 54, the circlip thereby retaining the keys 50 in the keyways 52 and preventing relative rotation between the connecting piece 20 and the nut 14.

When the joint is to be disconnected, the circlip 54 is first of all removed from is position in the groove 44 and the locking ring 46 is moved axially along the connecting piece 20 to disengage the keys 50 thereof from the keyways 52 in the nut 14. The lugs 18 of the nut 14 are then hammered from the opposite sides and the coupling procedure described above is generally reversed.

Releasable locking means as described serve to prevent inadvertent and undesirable rotation of the nut 14, thus obviating the necessity for periodic checking of the joint as would otherwise be required. A coupling provided with locking means as described is therefore suitable for applications heretofore considered unsuitable to a hammer union, for example in installations where heavy vibration would tend to loosen a conventional hammer union, or in permanent installations. It will be appreciated that such locking means effectively lock the two components of the coupling together to provide a rigid connection therebetween without any relative rotation between the components being possible.

Clearly the particular configuration of the locking means may vary from that shown. The co-operating means on the connecting piece 20 and the locking ring 46 may be other than serrations, for example flats, while the co-operating means on the locking ring 46 and the nut 14 may be other than keys and keyways, for example serrations on the adjacent surfaces thereof.

As with existing hammer key unions, the coupling can be made and broken very rapidly, while the use of a metallic sealing ring enables the couplings to have application in environments heretofore unsuited thereto, for example in all the high temperature situations, as well as the high pressure situation, detailed above and in which unions containing elastomer sealing rings could be used.

Although described in relation to hammer lug unions, the invention has application to any union incorporating a threaded nut, which nut may be rotated other than by hammering, for example by means of a spanner or a wrench.

What I claim and desire to secure by Letters Patent is:

1. A pipeline coupling comprising a length of pipe having first and second ends thereto, each said end having an end face, a first substantially annular connecting piece at the first end of said length of pipe, an internally-threaded nut located on, to surround, said first connecting piece, a second substantially annular connecting piece at the second end of said length of pipe, an external screw-thread formed around said second end and corresponding with the internal thread of said nut, and a sealing ring for location between adjacent end faces of two lengths of pipe to be connected, the arrangement being such that, on securing of the nut onto the externally threaded portion of the second connecting piece, the two connecting pieces are drawn axially towards one another to compress the sealing ring therebetween and to effect a seal between the two connecting pieces, the coupling further comprising a substantially annular locking ring mounted on the second connecting piece to be movable axially therealong but means for rotatably fixing said annular locking ring relative thereto, corresponding projections and recesses being provided on said locking ring and on said nut on the first connecting piece and adapted to engage with one another to prevent relative rotation between the first and second connecting pieces, and releasable means for retaining the projections and recesses on the locking ring and on the nut in engagement with one another, said releasable means comprising a retaining ring having a rear surface thereto, a continuous circumferential groove being defined in the second connecting piece to receive said retaining ring, the retaining ring reacting between said groove and the rear surface of the locking ring and being selectively releasable from within said groove.

2. A coupling as claimed in claim 1, a series of circumferentially-spaced, radially-projecting lugs being formed on the internally threaded nut.

3. A coupling as claimed in claim 1, wherein send means for rotatably fixing said annular locking ring includes a plurality of circumferentially-spaced, axially-extending serrations being provided on the external surface of the second connecting piece, and a corresponding plurality of co-operating serrations being provided on the internal surface of the locking ring.

4. A coupling as claimed in claim 3, wherein said projections and recesses include a plurality of circumferentially-spaced projections being provided on the locking ring to extend axially forwardly therefrom, the nut on the first connecting piece defining therein a corresponding plurality of recesses each adapted to receive an associated one of said projections.

5. A coupling as claimed in claim 1 in which the sealing ring is of metal, the first and second connecting pieces each having a tapering bore therethrough the diameter of which increases towards the end of the associated connecting piece, and the metallic sealing ring including a central annular portion for location between the end faces of the first and second connecting pieces, and opposed end portions having external circumferential surfaces which taper inwardly in a direction from the central annular portion towards the associated end of the sealing ring, the arrangement being such that, on location of the sealing ring between the first and second connecting pieces of the length of pipe to be connected, the opposed end portions of the sealing ring are received within the tapering bores of the first and second connecting pieces respectively, and, on screwing of the nut surrounding the first connecting piece onto the externally threaded portion of the second connecting piece, the two connecting pieces are drawn axially towards one another, the tapering surfaces of the sealing ring and the bores in the connecting pieces co-operating to distort said end portion of the sealing ring to effect seals between said ring and said bores.

6. A coupling as claimed in claim 5 in which the tapering surfaces of the opposed end portions of the metallic sealing ring and the central longitudinal axis of said ring define therebetween a first acute angle, the tapering surfaces of the bores of the first and second connecting surfaces of the bores of the first and second pieces and the central longitudinal axes of said connecting pieces defining therebetween a common second acute angle, the first acute angle being smaller than the second acute angle.

7. A coupling as claimed in claim 6 in which the end faces of the first and second connecting pieces define therein recesses to receive therein an associated part of the central annular portion of the metallic sealing ring, said end faces each including an annular outer region bounding the associated recess for abutment one with the other to determine the limit of axial movement of the connecting pieces one towards the other.

* * * * *